United States Patent [19]

Knoy et al.

[11] 3,988,291

[45] Oct. 26, 1976

[54] PRECISION-MOLDABLE ABRASION-RESISTANT MOLDING COMPOSITION AND MOLDINGS

[75] Inventors: Maurice G. Knoy, Lafayette, Ind.; Robert E. Wilkinson, Birmingham, Mich.; Kenneth W. Johansen, Lafayette, Ind.

[73] Assignee: Rostone Corporation, Lafayette, Ind.

[22] Filed: May 27, 1975

[21] Appl. No.: 580,768

[52] U.S. Cl................ 260/40 R; 260/42.17; 260/862
[51] Int. Cl.².................. C08K 3/34; C08L 67/06
[58] Field of Search......... 260/860, 862, 873, 40 R, 260/42.17

[56] References Cited
UNITED STATES PATENTS

| | | | |
|---|---|---|---|
| 3,397,169 | 8/1968 | Wilkinson | 260/862 X |
| 3,549,586 | 12/1970 | Smith et al. | 260/861 X |
| 3,668,178 | 6/1972 | Comstock et al. | 260/861 X |
| 3,701,748 | 10/1972 | Kroekel | 260/862 X |
| 3,718,714 | 2/1973 | Comstock et al. | 260/862 |
| 3,842,142 | 10/1974 | Harpold et al. | 260/862 |

Primary Examiner—Donald E. Czaja
Assistant Examiner—S. M. Person
Attorney, Agent, or Firm—Jenkins, Hanley & Coffey

[57] ABSTRACT

Mineral-filled thermosetting molding compositions having both precision-molding or low-shrink characteristics and also high abrasion resistance, plus other desirable properties. "Low profile" molding compositions, known to give smooth surface configurations, have low-shrink properties which also give precision molding characteristics of value in mechanically interfitting molded parts, but have such poor abrasion resistance as to be unusable for desirable applications. Both low-shrink and high abrasion resistance are obtained, with other desired properties, by including a known abrasion-improving polyolefin and by using a long-fiber asbestos as the reinforcing fiber, particularly either chrysotile asbestos or that known as blue asbestos or crocidolite.

21 Claims, 3 Drawing Figures

PRECISION-MOLDABLE ABRASION-RESISTANT MOLDING COMPOSITION AND MOLDINGS

BACKGROUND OF THE INVENTION

This invention relates to fiber-reinforced plastic moldings, and particularly to moldings and molding compositions which possess an especially advantageous combination of properties for certain applications, particularly a combination which includes both precision-molding properties and high abrasion resistance.

Thermosetting molding compositions containing mineral fillers and reinforced with mineral fibers are widely used to provide electrical and mechanical components having advantageous physical, chemical, and electrical characteristics.

For example, such compositions are employed to form intricate moldings used as the housings and frames of portable power tools and moldings used in assembly with each other and with contacts and other electrical elements to form electro-mechanical contactors and the like which include a movable contact carrier actuated by a built-in solenoid. In such applications, the moldings are subjected to both rubbing abrasion and impact abrasion from movement of the contact carrier and also to abrasion from electrical and mechanical vibration. For such applications, moldings made with mineral fillers such as aluminum hydrate, glass fibers, and with polyester or epoxy resins have many advantageous properties, for example, convenient and economic manufacture, good dimensional stability, high mechanical strength, good corrosion resistance, and good electrical characteristics, including high dielectric strength and high arc-resisting, arc-quenching, and non-tracking properties, but such moldings do not have adequate abrasion resistance.

It is known from Robert E. Wilkenson U.S. Pat. No. 3,397,169 that the abrasion resistance of such mineral-filled thermosetting molding compositions can be substantially improved by the addition to the mineral-filled thermosetting molding composition of a small proportion of polyethylene or other polyolefin which is solid at room temperature. In that U.S. Pat. No. 3,397,169, the abrasion-improving addition is made to general purpose thermosetting resin compositions, and the patent specifically mentioned polyester resins which contain free-radical initiators and modified epoxy resins such as epoxy-acrylate resins which are reactive in the presence of a free-radical catalyst.

The compositions of that prior Wilkinson patent have a relatively high degree of shrinkage during curing, with the result that they do not have precision-molding characteristics and moldings made therefrom are subject to warpage and do not have high precision and accuracy. In moldings which are to form the assembled parts of an electro-mechanical relay or switch, such as a contactor, and in many other applications, a degree of precision is required which often exceeds that obtainable by molding such compositions, and use of such compositions in these applications has required special steps to overcome warpage and secure accuracy, such as machining to meet critical dimensions.

Improved precision-molding characteristics can be obtained with certain mineral-filled thermosetting molding compositions by using in the composition a low-profile resin system which includes a "low-shrink" component. Low-profile resin systems and molding compositions are shown, for example, by the following patents:

| British No. 936,351 | Publ. 9/11/68 | F. J. Parker et al. British Industrial Plastics Ltd. |
| U.S. Pat. No. 3,549,586 | 12/22/70 | P. L. Smith et al. Union Carbide Corp. |
| U.S. Pat. No. 3,668,178 | 06/06/72 | L. R. Comstock et al. Union Carbide Corp. |
| U.S. Pat. No. 3,701,748 | 10/31/72 | C. H. Kroekel Rohm & Haas Company |
| U.S. Pat. No. 3,718,714 | 02/27/73 | L. R. Comstock et al. Union Carbide Corp. |

In general, these use a low-profile resin system which includes a thermosetting unsaturated polymer such as a polyester and a monomer such as styrene, and includes as a low-shrink additive therein a thermoplastic polymer which is soluble in the monomer but is not converted to a thermosetting material by or in the presence of the polymerization of the resin system.

These low-profile compositions were developed primarily to improve the surface finish of moldings which were to be painted and on which an especially smooth surface was needed. The same low-shrink characteristics which give good surface finish also give precision molding characteristics which are highly desirable in forming moldings which require high mechanical accuracy. It is found, however, that the low-profile molding compositions have very poor abrasion resistance, and while the teachings of the Wilkinson U.S. Pat. No. 3,397,169 may be used to improve the poor abrasion resistance of low-profile compositions, the improvement is not sufficient to overcome the poor abrasion resistance, and the resulting moldings do not have adequate abrasion resistance for the applications here contemplated.

This failure was especially critical in the development of an improved electro-mechanical contactor switch in which both precision molding and high abrasion resistance were essential, along with other properties provided by mineral-filled thermosetting polyester molding compositions. There are numerous other applications where this combination of properties would be of high value.

By precision molding properties, we mean that the composition may be molded in precision dies and will form molded parts in which little or no shrink occurs during cure and which match the dies with a high degree of precision, for example, with a variance therefrom of not to exceed ±0.0005 inch per inch and with little or no warpage or distortion. This compares with a variance of ±0.003 inch per inch or more and warpage problems with corresponding moldings made with general purpose molding composition of a comparable formula not including a low-profile resin system. This is an improvement by a factor of 6 in an accuracy range which is already highly exact.

The very poor abrasion resistance of low-profile molding compositions is not well understood, but it evidently involves the resin system and its characteristics and behavior in relation to the fillers and reinforcing fibers and other components of the composition.

SUMMARY OF THE INVENTION

In accordance with the present invention, both precision-molding characteristics and abrasion resistance are obtained in a mineral-filled thermosetting molding composition, along with other necessary properties, by incorporating in a low-profile molding composition an abrasion-improving additive as taught by U.S. Pat. No. 3,397,169, and also by using as at least the primary reinforcing fiber therein a long-fiber asbestos, preferably either chrysotile asbestos or that known as blue asbestos or crocidolite. Desirably, such asbestos constitutes a substantial part of the mineral filler in the composition, and constitutes the entire reinforcing fiber.

A molding composition in accordance with the present invention comprises the following components in proportions given. Proportions are by weight.

a. A low-profile resin system including a thermosetting resin, a monomer and solvent, a catalyst or initiator, and a low-shrink additive. This resin system desirably constitutes from 15% to 60% of the composition. The low-shrink additive may comprise from 1% to 60% or preferably from 5% to 40% of the resin system, and from about 1% or less up to about 25% of the total composition.

b. From 40% to 85% of mineral filler of which up to one-half is mineral fibrous material. The fibrous material is at least largely and preferably entirely long-fiber asbestos. We have had good results with and prefer to use either chrysotile asbestos or that known as blue asbestos or crocidolite. Such asbestos desirably constitutes from 5% to 40%, and preferably from 5% to 25%, of the total composition.

c. From ½ of 1% to 10% of an abrasion-resistant additive as disclosed in U.S. Pat. No. 3,397,169, preferably polyethylene, and d. Minor amounts of supplementary ingredients such as processing aids, colorants, mold release agents, etc., in accordance with known practices in the compounding and molding art.

The low profile resin system used may be any of such known systems as represented by those disclosed in the patents listed above and which employ a polyester-type thermosetting resin. The polyester resin is desirably a free-radical initiated polyester. Such resins are commonly obtained or compounded to include free-radical initiators or catalysts and the present invention does not depend on the use of any particular initiator. The system also contains a monomer which is usually a solvent for the polyester and which copolymerizes therewith. On the basis of availability and cost, styrene is widely used as such monomer and solvent, and is suitable for use here.

The resin system also includes a low-shrink additive. This may be any of the many thermoplastic polymers disclosed in the patents listed above. In general, these comprise thermoplastic polymers which are soluble in the monomer of the resin system or a monomer compatible therewith, and which are not converted to thermosetting materials by the polymerization reaction of the resin system. The additives are preferably added to the resin system and mixed therewith before the resin system is mixed with the fillers.

Low-shrink additives which may be used in the resin systems include:

polymers of vinyl acetate, such as copolymers of vinyl acetate and acrylic or methacrylic acid, as disclosed in U.S. Pat. No. 3,718,714;

polymers of substances having a polymerizable reactive $CH_2=C=$ group such as polymers of methylmethacrylate and the like, and styrene, and copolymers thereof with other compounds, as disclosed in part in British Pat. No. 936,351 and more fully by U.S. Pat. No. 3,701,748; and polymers of cyclic esters, such as caprolactone and other lactones as disclosed in U.S. Pat. Nos. 3,549,586 and 3,668,178.

The mineral fillers used, other than the fibrous asbestos mentioned below, may be any of a large number of fillers and mixtures of fillers which are known and used in the art, and may be selected from the following typical groups: calcium carbonate, clay, silica, talc, alumina, hydrated alumina, calcium sulfate, calcium silicate, antimony trioxide, etc. For electrical applications requiring arc-resistance, the composition desirably includes from 30% to 70% of hydrated alumina. For other applications, the amount of hydrated alumina may range from none to 70% and other fillers may be used.

The mineral fiber used is at least largely and preferably substantially entirely a long-fiber asbestos product, as more fully discussed below. Use of the asbestos is primarily to enhance abrasion resistance while also providing adequate strength and other properties, and hence it should be used on parts or at surfaces which are subject to abrasion. It is contemplated that other fibers or special compositions may be used at particular locations in a molding where extra strength or other characteristics than abrasion resistance are of prime importance. For example, glass fiber reinforcement may be used at selected locations subject to high stress, or special arc-resistant materials may be included at surfaces exposed to arcing.

Asbestos occurs in a number of different grades and in six recognized varieties, including a fibrous form known as chrysotile and five minerals of the amphibole group. These have been used as fillers and reinforcing materials and especially as thickeners in various thermoplastic and thermosetting resin compositions, as set forth, for example, in articles thereon in recent editions of Modern Plastics Encyclopedia. However, we believe it has not been known that any of the different varieties of asbestos could have the effect of overcoming the very poor abrasion resistance which occurs in low-profile molding compositions. Indeed, the 1969–70 edition of Modern Plastic Encyclopedia notes that one of the disadvantages of asbestos as a fiber reinforcement is its abrasiveness.

In accordance with the present invention we have found that for the purpose of enhancing abrasion resistance in compositions of the present invention, the asbestos to be used is preferably a grade designated commercially as "long-fiber" asbestos, and is preferably either chrysotile asbestos such as that available from Johns-Manville Company under the trademark "Plastibest", or that known as blue asbestos or crocidolite.

Asbestos has a thickening effect in molding compositions, in which respect it differs substantially from the commonly used glass fiber, and the maximum usable proportion of asbestos is limited by the necessity to avoid such excessive thickening as would interfere with the desired molding results in the particular molds used.

The composition also includes an abrasion resistance additive in accordance with the teachings of Wilkinson U.S. Pat. No. 3,397,169. Such abrasion-resistant additive is a polyolefin which is solid at room temperatures. In compositions containing a free-radical initiated resin and a free-radical catalyst, the added polyolefin is believed to chemically react and cross link with the resin to maintain or improve physical properties of the finished moldings. The term "polyolefin" applies to a known group of synthetic resins of which polyethylene and polypropylene are presently the most readily available and preferred polymers. The group comprises various classes or types of polyethylenes, including the low-density or branched-chain polymers, the high-density or linear polymers, and the medium-density polyethylenes. The group also includes polyethylene copolymers produced by copolymerizing the polyethylene with a minor proportion of an alpha-olefin such as propylene or butene-1 or an acrylate for the purpose of modifying certain characteristics, and these may be used. The preferred polyethylene is desirably used in an amount of from 2% to 5% of the composition.

The preferred method of making a molding composition in accordance with the present invention differs somewhat from conventional practices with glass-filled compositions, because of the different characteristics of asbestos from those of glass fiber. The asbestos has absorbent and thickening properties, and whereas glass is usually added last, the asbestos is desirably thoroughly mixed with the resin system before the other fillers are added. Compounding may be as follows: First, the resin system is charged to a mixer such as a sigma blade mixer and preliminary mixing is carried out as needed to obtain a uniform composition of the resin system. In some cases, the thermoplastic and thermosetting resins are not mutually or fully soluble in the monomer solvent and mixing is necessary to secure a uniform blend or suspension of the two. The asbestos is then added and mixing continued, as for thirty minutes or so, until thorough disperison and wetting of the two components is obtained. The other filler and the abrasion-improving additive are than added, either together or in succession and mixing is continued until a uniform blend is obtained. The minor amounts of supplemental components may be added at any appropriate times depending on their physical character, that is, liquid or soluble components may be added to the initial resin system, while dry powdered components such as colorants may be added either separately to the resin system or with one of the major dry components.

The composition may be molded under heat and pressure in the same way as known low-profile compositions. For example, a measured charge of the composition is placed in a heated mold, for example, at 300° F., and the mold is closed on the material under pressure and held for a time, for example, from 1 to 3 minutes, sufficient to cause polymerization and cure of the composition. The molded piece is then removed from the die.

Moldings produced with the compositions of the present invention have advantageous properties corresponding to those of the best previously mineral-filled thermosetting polyester resin compositions. These comprise good electrical properties including high dielectric, area-quenching, arc-resistant, and non-tracking properties. The compositions have good moldability and consistently give uniform moldings. The moldings have high dimensional stability, good corrosion resistance, and satisfactory physical strength. The moldings are outstanding in the precision and accuracy with which they conform to the shape and dimensions of the molding dies, in their freedom from shrink deformities and surface imperfections and warpage, and in the high degree of abrasion resistance which they possess in combination with the other advantageous properties which are essential to the highly demanding applications here contemplated. The combination of properties makes the new compositions economically advantageous both in production and use, and permits the moldings to meet precise dimensional requirements and high wear-resistant requirements as molded, without need for machining, clamping, or other special treatment of the molded units.

BRIEF DESCRIPTION OF THE DRAWINGS

The accompanying drawings illustrate the invention. In such drawings.

DESCRIPTION OF THE PREFERRED EMBODIMENT

Figure 1:
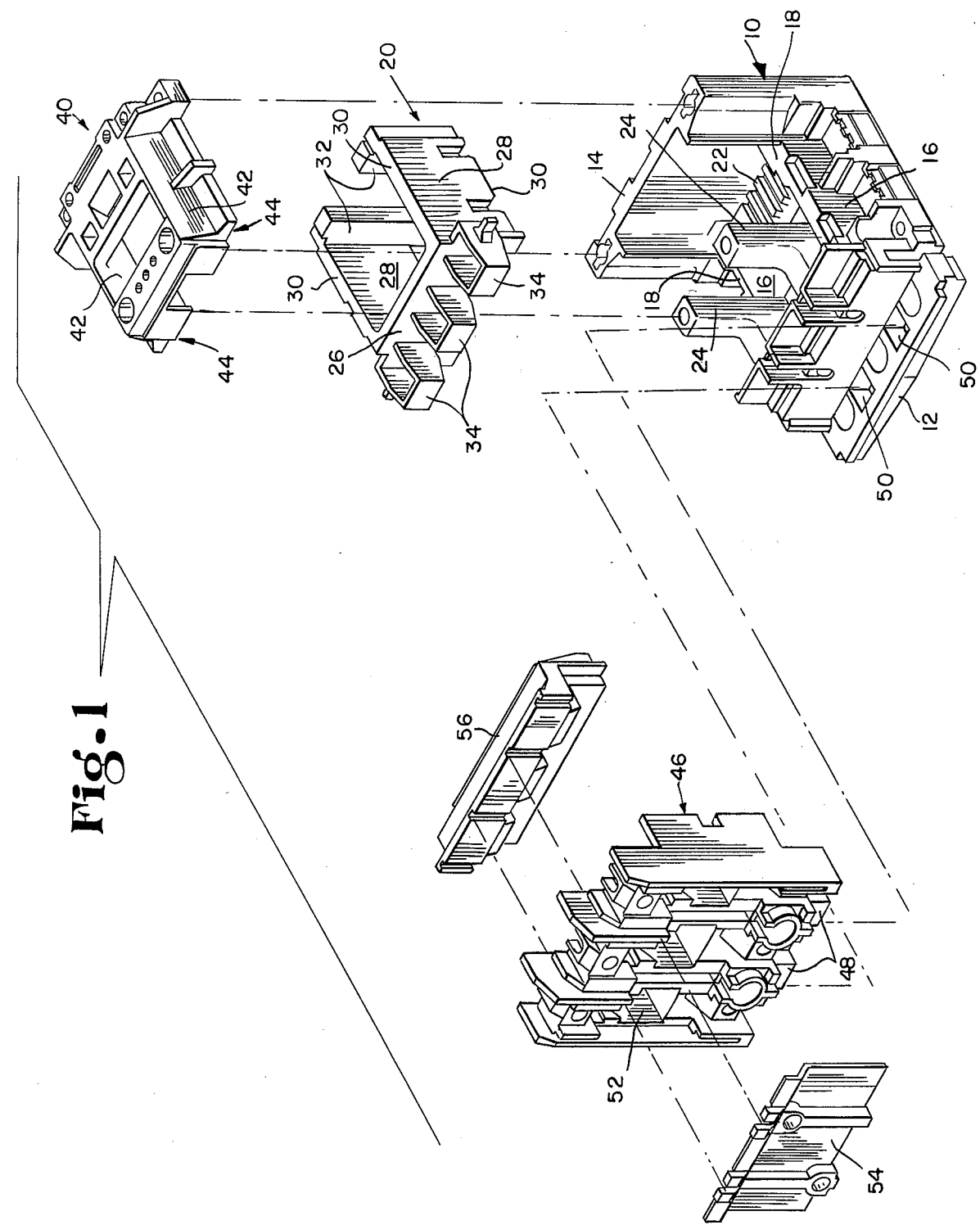
FIG. 1 is an exploded isometric view of a set of moldings for assembly to form the frame and movable contact carrier for an electro-mechanical contactor.

The set of moldings shown in FIG. 1 are for assembly to form the base, frame, and movable contact carrier of an electro-mechanical contactor which also includes various electrical components and is used to control the power circuit of a motor or other electrical load. The moldings are shown in FIG. 1 in an orientation which was found convenient for purposes of illustration, but are normally used in a different orientation, rotated 90° clockwise from the orientation shown. The contactor moldings comprise a base unit 10 having a rear mounting wall 12 which in use is mounted against a vertical panel support, and having an end or bottom wall 14. The base is formed with spaced ribs 16 which form rails having slideway surfaces 18 for engagement by the slide-bearing surfaces of the cross bar 20. The base molding 10 is also formed at the lower end of its mounting wall 12 with a series of parallel grooves and ribs 22 which form guides for mating ribs and grooves formed on a hidden portion of the cross bar 20. The base molding 10 also has a pair of posts 24 spaced from each other and from the end wall 14, and the space between the posts and wall forms a cavity for the reception of the solenoid coil and core of the contactor.

The cross bar 20 is a generally U-shaped member having a front or top cross wall 26 and two side walls 28. The upper and lower edges of the side walls 28 define slide-bearing surfaces 30, one pair of which rides on the slideway surfaces 18 of the ribs 16. The rear of the cross bar has a pair of inturned flanges 32 which are interconnected by a cross piece (hidden in this view) which carries a series of ribs and grooves that engage the grooves and ribs 22 of the base molding 10. The cross wall 26 of the cross bar carries three yokes 34 in which the movable contacts of the contactor are mounted.

A cover molding 40 mounts against the ends of the posts 24 and the edge of the end wall 14 of the base molding 10. It includes side walls 42 which at their edges define slideway surfaces 44 which slidably engage the upper pair of slide-bearing surfaces 30 of the cross bar 20.

An arc hood 46 fits against the end face of the assembled base molding 10 and cover molding 40 and has lugs 48 which fit into sockets 50 formed in the mounting wall 12 of the base 10. Such arc hood 46 carries three sets of fixed contacts on its inner face, in suitably formed cavities and in position to be engaged by the movable contacts carried in the yokes 34 of the cross bar 20. The arc hood 46 has three spaced passages 52 into which the yokes 34 of the cross bar project and in which they move as the contacts are closed. The end face of the arc hood 46 is closed by an arc hood cover 54 which interfits with the art hood and is secured in place with a pair of screws. There is also an arc hood top cover 56 which interfits with the arc hood. The moldings together define an arc chamber about each set of contacts, to enclose them and isolate them from each other.

In an assembled motor contactor unit, the mounting wall 12 of the base molding 10 stands in a vertical position, with the wall 14 at the bottom thereof. The cross bar 20 is oriented with its yokes 34 at the top, and surrounds the solenoid coil. Its flanges 32 are fixed to the armature of the solenoid so that energization of the solenoid lifts the cross bar vertically upward to carry its contacts into engagement with the fixed contacts carried by the arc hood. The cross bar is urged downward (rearward as shown) to open position both by gravity and by springs mounted in the assembly.

The several moldings have precise interfitting engagements so as to define an accurate slideway and bearing surfaces for the cross bar, to support it for free and accurate sliding movement in response to actuation and deactuation of the solenoid coil. The cross bar slides directly on the other moldings without interposed bearings or wear plates. The moldings support the contacts and other electrical components in precisely located positions. They also form interrelated ribs and walls which define the arc chambers and enclose and separate the three sets of contacts from each other. They also support and insulate the various other electrical components. The assembly forms a highly compact unit which performs a variety of both physical and electrical functions and is subject to both physical and electrical stress. In operation its parts are subjected to rubbing wear from movements of the cross bar, to impact wear as such movements stop, and to vibration wear from alternating current hum. They must withstand high electrical potential and the effects of arcing from contact closings and openings. The moldings are intricate interfitted parts, which require both precision-molding characteristics and high wear and abrasion resistance in the molding compositions of which they are made, so as to withstand millions of operations and provide a long operative life. The moldings must also have essential electrical characteristics including high dielectric strength, good arc-resistance and non-tracking properties, and good physical characteristics including adequate strength and especially precise dimensional control during formation in the molding step and high dimensional stability and freedom from warpage and distortion. Prior molding compositions did not provide necessary combination of properties to satisfy these requirements, whereas compositions of the present invention do provide such critical properties and make the improved contactor feasible.

The presence of many of these properties can be determined by inspection or known tests. Tests for abrasion resistance have been conducted on various types of equipment, designed to simulate conditions encountered in use. Two types of test equipment we have found useful are illustrated in FIGS. 2 and 3 of the drawing.

Figure 2:
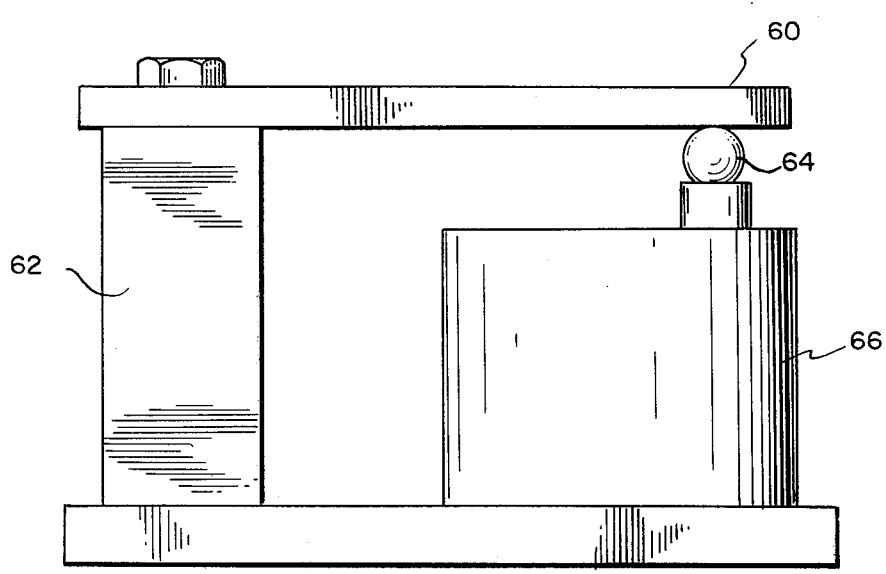
FIG. 2 is a diagrammatic side elevation of a test device in which abrasion resistance is indicated by the depth to which a vibrating metal ball penetrates a test sample in a predetermined time.

In the test apparatus of FIG. 2, a test sample 60 is fixed on a support 62 and a steel ball 64 is vibrated in contact with the sample, under a predetermined load, by a vibrator 66. The depth of ball penetration in a given time, for example one hour, indicates the resistance of the sample to abrasion resulting from mechanical or electrical vibration.

Figure 3:
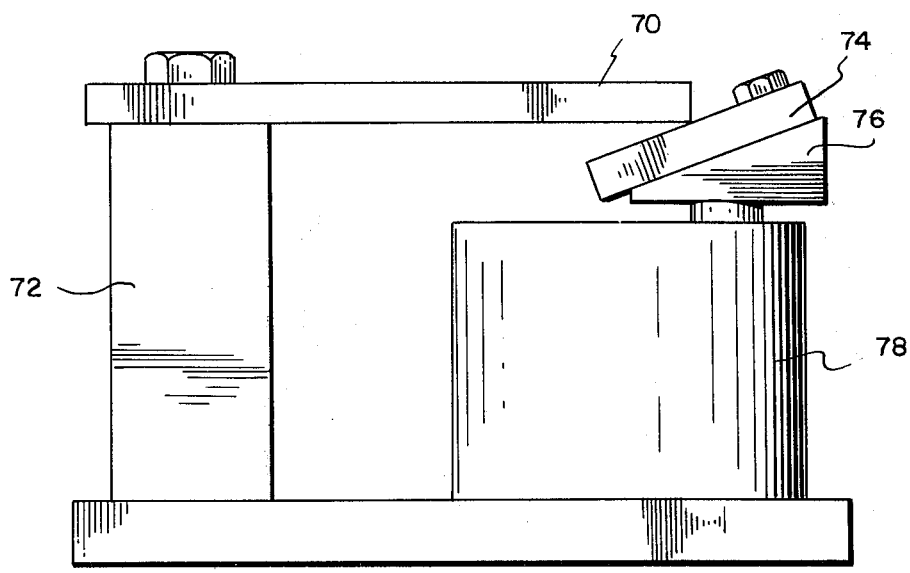
FIG. 3 is a diagrammatic side elevation of a test device in which abrasion resistance is indicated by the depth of penetration of the corner of one test sample into the face of another test sample vibrated against the first.

In the test apparatus of FIG. 3, one test sample 70 is fixed on a support 72 and a second sample 74 is mounted on an angle block 76 in contact with a corner of the first sample 70, under a predetermined pressure. The angle block 76 and second sample 74 are vibrated by a vibrator 78 for a specified length of time, for example one hour, and the depth of penetration into the surface of the test sample 74 is taken as an indication of the abrasion resistance.

The invention is illustrated by the following examples, which are given as typical and representative, and not as limiting.

In such examples, the proportions given are by weight. In each test on the apparatus of FIGS. 2 and 3, a group of five test samples were tested under standardized test conditions for test periods of 1 hour, and the abrasive penetration results given represent the results on all five samples. The numerical values given for abrasion penetration represent depth of penetration measured on a standardized scale.

EXAMPLE 1

As representative of the prior art general purpose molding compositions, moldings were made from a molding compound containing 25% of a general purpose polyester resin system including polyester polymer, a monomer, and a catalyst or initiator. The compound also contained 15% glass fiber and 60% mineral filler, and compounds were made both with and without the addition of 3% polyethylene in accordance with the teachings of U.S. Pat. No. 3,397,169. The compounds corresponded to those of Example 2 of that patent. Test samples of such moldings gave the abrasion resistant results shown in Items 1a and 1b of Table I set forth below. It will be seen that the presence of 3% polyethylene in this glass-filled, general purpose compound produced substantial improvement of both vibration abrasion resistance (FIG. 2) and rubbing abrasion resistance (FIG. 3).

EXAMPLE 2

Moldings were made from a known low-profile molding compound containing 24% of a low-profile resin system, containing a free-radical initiated polyester polymer, a monomer and solvent, specifically styrene, a free-radical initiator or catalyst, and a thermoplastic polymer low-shrink additive. The compound also contained 15% glass fiber, 61% filler (hydrated alumina), and minor amounts of supplementary components. Moldings of the same composition with the further addition of 3% polyethylene powder were also prepared. Test samples of such moldings gave the abrasion resistance results reported in Items 2a and 2b of Table I. It will be seen that the low-profile compound without polyethylene had much lower abrasion resistance than the general purpose composition, and that while the addition of 3% polyethylene substantially improved the abrasion resistance, the abrasion resistance of the improved compound was significantly inferior to that of the general purpose compound with polyethylene in the vibration test apparatus of FIG. 2 and greatly inferior to the general purpose composition either with or without polyethylene on the rubbing abrasion apparatus of FIG. 3. Thus, the low-profile compound with the abrasionimproving polyethylene additive gave a rubbing abrasion test result of 2.4 which is substantially higher than the 1.7 given by the general purpose composition without polyethylene, and even worse in comparison with the test result of 1.0 given by the general purpose composition with polyethylene.

Sets of test moldings were prepared as shown in FIG. 1, in which the base molding 10, the cover molding 40, and the cross bar 20 which slides on the other two were made from the low-profile glass-filled composition containing 3% polyethylene of this Example 2, and such moldings were furnished to an electrical apparatus manufacturer for assembly and test in an electro-mechanical contactor. We are advised that the moldings were assembled with other parts to form operating contactors and that these were subjected to cycling tests to measure wear resistance and operating life under operating conditions, and that such contactors were found unsatisfactory because of excessive abrasion and wear of the moldings.

It is pointed out that abrasion and rubbing wear occur primarily between the cross bar 20 and the combined base 10 and coil cover 40 which form the slideway in which the cross bar 20 moves and with which it has sliding contact; and that the arc hood 46 and its covers 54 and 56 are subjected to less physical wear, and that is substantially all vibration wear and not rubbing wear. On the other hand, the arc hood 46 and its covers 54 and 56 define the arc chambers of the device and are subjected to substantial arcing exposure. Because of these differences, the arc hood 46 and its covers 54 and 56 may be molded of a composition which is compounded to produce maximum arc resistance, even at the expense of some loss of abrasion resistance, whereas the base 10, cross bar 20, and cover 40 which are subjected to critical rubbing wear and abrasion and less arc exposure should be made of a compound having maximum abrasion resistance even at the expense of less arc resistance.

EXAMPLE 3

Moldings were made from a molding composition in accordance with the present invention, containing 29% of the low-profile resin system used in Example 2, 15% of the particular asbestos known as blue asbestos or crocidolite, 3% polyethylene, and 53% alumina hydrate filler. Test samples of such moldings gave the abrasion resistance results shown in Item 3a of Table I. It will be seen that on the vibration resistance test with the apparatus of FIG. 2, the low-profile composition in accordacne with the invention gave a test result of 0.6 which is a substantial improvement over the 1.0 result with the low-profile glass-filled compound containing the polyethylene abrasion-improving additive, and was better than the 0.7 result obtained with the general purpose composition containing polyethylene. The improvement in the rubbing abrasion test with the apparatus of FIG. 3 was even more pronounced. The low-profile asbestos-filled compound with polyethylene, in accordance with the present invention, gave a test figure of 0.3 which was an improvement by a factor of 8 over the 2.4 result given by the low-profile glass-filled compound containing polyethylene. The result was also a substantial improvement over the 1.0 result obtained with the general purpose compound containing polyethylene. This rubbing abrasion result was particularly important for the purpose of molding the contactor components shown in FIG. 1 which are subjected to rubbing wear, namely, the cross bar 20, the base molding 10, and the cover molding 40.

Test moldings were made as shown in FIG. 1 in which the base molding 10, the cross bar 20, and the cover 40 were molded of the composition of this Example 3 while the arc hood 46 and its covers 54 and 56 were made of an arc-resistant composition. The moldings were furnished to the manufacturer for test use in an electro-mechanical contactor. We are advised that various wear-resistance, abrasion-resistance, and like tests were made using a combination of moldings made from the asbestos-filled compound containing propylene of Example 3 and from the low-profile glass-filled compound containing polyethylene of Example 2a. We are advised that the wear life was improved by using a cross bar 20 made of the compound of Example 3 with a base 10 and cover 40 made of the low-profile glass-filled compound containing polyethylene of Example 2, but that the wear results were not fully satisfactory. We are further advised that satisfactory results were obtained only when the base, cross bar, and coil cover were all made from the low-profile asbestos-filled compound containing polyethylene of Example 3 in accordance with the present invention.

The test results referred to in Examples 1, 2, and 3 are given in the following table:

TABLE I

| Example | Composition | Test Results FIG. 2 | Test Results FIG. 3 |
| --- | --- | --- | --- |
| 1a | General purpose; no polyethylene | 2.5 | 1.7 |
| 1b | General purpose; plus 3% polyethylene | 0.7 | 1.0 |
| 2a | Low-profile, glass-filled; no polyethylene | 5.0 | 13.0 |
| 2b | Low-profile, glass-filled; 3% polyethylene | 1.0 | 2.4 |
| 3a | Low-profile, crocidolite-filled; 3% polyethylene | 0.6 | 0.3 |

EXAMPLE 4

Moldings were made from a molding composition in accordance with the present invention, containing 30% of the low-profile resin system used in Example 2, 15% of long-fiber chrysotile asbestos (obtained from Johns-Manville under the trademark "Plastibest"), 3% polyethylene, and 53% alumina hydrate. Test samples of such moldings were tested in comparison with the low-profile, glass-filled, polyethylene containing compositions of Example 2 (sample 2b in Table I), and with the composition of Example 3 (sample 3a of Table I). Tests were run both on the apparatus of FIG. 2 and on that of FIG. 3, and in each case a number of samples were tested for the same specified time, the depth of wear penetration on each test sample was measured in thousandths of an inch, and the average obtained for each composition. The results were as follows:

TABLE II

| Example | Composition | Test Results | |
|---|---|---|---|
| | | FIG. 2 | FIG. 3 |
| 4a (2b) | Low-profile, glass-filled; 3% polyethylene | 1.3 | 2.0 |
| 4b (3a) | Low-profile, crocidolite-filled; 3% polyethylene | 0.35 | 0.12 |
| 4c | Low-profile, chrysotile-filled; 3% polyethylene | 0.36 | 0.12 |

The results for test samples 4a were similar to those obtained with the same glass-filled composition in test samples 2b reported in Table I. The test samples 4b of the same composition as in Example 3, containing blue or crocidolite asbestos in accordance with the present invention, again gave results showing a substantial improvement in wear resistance over the glass-filled samples 4a. The test samples 4c of the composition of this Example 4, containing long-fiber chrysotile asbestos in accordance with the present invention, gave results nearly the same as samples 4b and likewise showed a substantial improvement by a factor of nearly 4 over the corresponding glass-filled composition.

EXAMPLE 5

The proportions of the ingredients of compositions in accordance with the present invention may be varied from those given in Examples 3 and 4, over a range previously set forth in this specification. Examples of compositions containing different proportions of such components are as follows:

| Component | Composition | | | |
|---|---|---|---|---|
| | 5A | 5B | 5C | 5D |
| Low-profile resin system | 20% | 25% | 30% | 40% |
| Asbestos | 5% | 10% | 15% | 25% |
| Filler | 72% | 62% | 52% | 32% |
| Polyethylene | 3% | 3% | 3% | 3% |

Various other examples might be given. The resin system should be present in sufficient amount to provide adequate binder for the molded products and adequate plasticity to the composition, and may range up to 60% or more of the basic composition. The top limit of resin is usually a matter of economics. The asbestos should be present in a significant amount of at least 5% and its top amount may be limited by its thickening effect on the composition. The nature and quantity of the other filler may follow conventional practices, and the amount may vary over a wide range from about 20% to about 80% of the composition. The nature and quantity of abrasion-improving additive may follow the teachings of U.S. Pat. No. 3,397,169.

The improved composition made in accordance with the invention, as particularly exemplified by Examples 3 and 4, provide and especially advantageous combination of properties. The low-profile resin system provides precision moldings which have zero shrink or substantially zero shrink, for example, less than 0.0005 inch per inch, so that the moldings precisely reflect the size and shape of the dies, and incur substantially no warpage or distortion when removed from the dies. The moldings can thus be made with good surface flatness and accuracy and in intricate interfitting shapes as required, for example, in the improved contactor moldings shown in FIG. 1 and in other applications where precise dimensions and alignment are required. The moldings also have good dimensional stability so that the design precision is maintained. Most importantly, the moldings have good abrasion resistance which in combination with low-profile characteristics of good surface flatness and accuracy permits moldings to slide or otherwise bear on each other without intervening wear plates and provides long wear life. The compositions also provide good electrical characteristics and satisfactory physical strength as needed in demanding electrical and mechanical applications.

The foregoing specification sets forth specific compositions and structures in considerable detail for the purpose of exemplifying the invention and indicating modifications. It will be understood that various other modifications may be made by those skilled in the art without departing from the spirit of the invention or the scope of the following claims.

We claim:
1. A molding composition adapted to undergo thermosetting reaction under molding conditions to produce a molding having both low-shrink characteristics and high abrasion resistance, comprising from 15% to 60% by weight of a low-profile resin system containing a free-radical initiated thermosetting polymer, a free-radical initiator therefor, a copolymerizable monomer, and a thermoplastic resin low-shrink additive,
from about 5% to about 40% of long fiber asbestos, such asbestos constituting substantially the entire fiber content of the composition,
from about 20% to about 80% of other mineral filler, not including any substantial amount of glass fiber, and
from about one-half percent to about 10% of an abrasion-improving additive consisting of a polyolefin which is solid at room temperature.

2. A molding composition as in claim 1 in which the asbestos is either chrysotile or crocidolite asbestos.

3. A molding composition as in claim 2 in which the thermosetting polymer is a polyester polymer.

4. A molding composition as in claim 3 in which the other mineral filler is hydrated alumina.

5. A molding composition as in claim 2 in which the asbestos is present in an amount not exceeding that of the other mineral filler.

6. A molding composition as in claim 3 which contains about 30% resin system, about 15% asbestos, about 50% of hydrated alumina, and from 2% to 5% of polyethylene.

7. A molding composition as in claim 3 in which the abrasion-improving additive is a polyethylene resin.

8. A molding composition as in claim 3 in which the abrasion-improving additive is a polypropylene resin.

9. A molding composition as in claim 2 in which said low-shrink additive constitutes from about one-half percent to about 25% of the composition and is a polymerized thermoplastic compound which is soluble in said monomer or a compatible solvent intermixed therewith and which is not converted to a thermoset material under the conditions of molding and curing the composition.

10. A molding composition as in claim 2 in which said low-shrink additive is a polymer of vinyl acetate and constitutes from 5% to 40% of the resin system.

11. A molding composition as in claim 2 in which said low-shrink additive is a polymer having a polymerizable $CH_2=C=$ group and constitutes from 5% to 40% of the resin system.

12. A molding composition as in claim 2 in which said low-shrink additive is a polymer of a cyclic ester and constitutes from 5% to 40% of the resin system.

13. A cured thermoset molding having both low-shrink characteristics and high abrasion resistance, composed of a composition as set forth in claim 1.

14. A cured thermoset molding having both low-shrink characteristics and high abrasion resistance, composed of a composition as set forth in claim 2.

15. A molding as in claim 14 in which the thermosetting polymer of the composition is a polyester polymer.

16. A molding as in claim 15 in which the other mineral filler is hydrated alumina.

17. A molding as in claim 16 in which the abrasion-improving additive is polyethylene or polypropylene.

18. A molding as in claim 17 in which the low-shrink additive is a polymer of a cyclic ester and constitutes from 5% to 40% of the resin system.

19. A molding as in claim 17 in which the low-shrink additive is a polymer of a vinyl acetate and constitutes from 5% to 40% of the resin system.

20. A molding as in claim 17 in which the lowshrink additive is a polymer having a polymerizable $CH_2=CH=$ group and constitutes from 5% to 40% of the resin system.

21. A cured thermoset molding having both low-shrink characteristics and high abrasion resistance, composed of a cured composition containing:
    about 30% of a low-profile resin system containing a free-radical initiated polyester polymer, a free-radical initiator therefor, a copolymerizable monomer, and a thermoplastic resin low-shrink additive,
    about 15% of crysotile or crocidolite asbestos and no substantial amount of glass fiber,
    about 50% of hydrated alumina, and
    from 2% to 5% polyethylene.

* * * * *